(12) United States Patent
Cain

(10) Patent No.: US 11,461,381 B2
(45) Date of Patent: Oct. 4, 2022

(54) SYSTEM AND METHOD FOR DYNAMICALLY ACCESSING MEDIA ASSETS

(71) Applicant: GRASS VALLEY LIMITED, Newbury (GB)

(72) Inventor: James Westland Cain, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 343 days.

(21) Appl. No.: 16/569,323

(22) Filed: Sep. 12, 2019

(65) Prior Publication Data

US 2020/0089701 A1   Mar. 19, 2020

Related U.S. Application Data

(60) Provisional application No. 62/730,931, filed on Sep. 13, 2018.

(51) Int. Cl.
| | |
|---|---|
| *G06F 16/435* | (2019.01) |
| *G06F 9/54* | (2006.01) |
| *G06F 16/438* | (2019.01) |
| *G06F 16/16* | (2019.01) |
| *H04L 67/06* | (2022.01) |

(52) U.S. Cl.
CPC .............. *G06F 16/435* (2019.01); *G06F 9/54* (2013.01); *G06F 16/164* (2019.01); *G06F 16/438* (2019.01); *H04L 67/06* (2013.01)

(58) Field of Classification Search
None
See application file for complete search history.

(56) References Cited

U.S. PATENT DOCUMENTS 10,970,843 B1 *  4/2021  Olsen ................ H04N 21/4316
2009/0217352 A1   8/2009  Shen et al.
(Continued)

FOREIGN PATENT DOCUMENTS

| EP | 3293647 A1 | 3/2018 |
|---|---|---|
| GB | 2505654 A | 3/2014 |

OTHER PUBLICATIONS

International Search Report & Written Opinion received in PCT/GB2019/052572 dated Dec. 16, 2019.

*Primary Examiner* — Kim T Nguyen
(74) *Attorney, Agent, or Firm* — Arentfox Schiff LLP

(57) ABSTRACT

A system is provided for configuring legacy file-based workflows to remotely and dynamically access media essence. An example system includes a filename generator that dynamically generates a filename for corresponding media content in an essence store in response to a selection by a file-based workflow application running on a media production computing device. The system includes an identity file generator that generates a respective identity file for the selected content and that includes the generated filename. Furthermore, the system includes a content API that queries an essence access database using the generated identity file to obtain metadata that indicates access information for the media content. The content API then configures the file-based workflow application to access the media content from the essence store based on an accessed track number and byte length of the respective media content accessed in response to the query of the media essence access database.

4 Claims, 6 Drawing Sheets

(56) References Cited

U.S. PATENT DOCUMENTS

| | | |
|---|---|---|
| 2012/0144302 A1 | 6/2012 | Campanotti et al. |
| 2019/0132619 A1* | 5/2019 | Mazur ................ H04N 21/8456 |
| 2020/0089701 A1* | 3/2020 | Cain ........................ G06F 9/54 |
| 2020/0319933 A1* | 10/2020 | Meyer ................... G06F 9/5044 |
| 2021/0058652 A1* | 2/2021 | Cain ............. H04N 21/234363 |
| 2022/0038757 A1* | 2/2022 | Ghavami ........... H04N 21/2668 |

* cited by examiner

SYSTEM AND METHOD FOR DYNAMICALLY ACCESSING MEDIA ASSETS

CROSS REFERENCE TO RELATED APPLICATIONS

The current application claims priority to U.S. Provisional Patent Application No. 62/730,931, filed Sep. 13, 2018, entitled "System and Method for Dynamically Accessing Media Assets", the contents of which are hereby incorporated in its entirety.

TECHNICAL FIELD

The present disclosure generally relates to remote accessing of media content, and, more particularly, to a system and method for configuring legacy file-based workflows to remotely and dynamically access media assets.

BACKGROUND

Currently, existing media production systems use file-based workflow, from ingest to playout, where the digital media is contained in a plurality of files and played out according to configurable workflows set by the production system. Advantageously, the file-based approach has improved media product efficiency through the lack of a need for tape-based transport or storage, far easier process automation, and the ability to easily handle multiple formats, for example. However, such file based infrastructure also can lead to a series of digital databases that have poor interoperability and little metadata flow. As a result, it is difficult to add new functions to the production chain or upgrade the media production system. Moreover, it can be difficult for such file-based systems to provide real visibility on content and gain standard views of asset usage, traffic and the like.

Accordingly, a system and method is needed for enabling legacy file-based workflows to remotely and dynamically access media content with improved interoperability between systems.

SUMMARY

Thus, according to an exemplary aspect, a system and method is provided for configuring legacy file-based workflows to remotely and dynamically access media essence. An example system includes a filename generator that dynamically generates a filename for corresponding one media asset in an essence repository in response to a selection of the media asset by a file-based workflow application running on a media production computing device. Moreover, the system includes an identity file generator that generates a respective identity file for the selected media asset with the identity file including the generated filename and otherwise without any meaningful data content. Furthermore, the system includes a content application programming interface (API) that queries an essence access database using the generated identity file to obtain metadata that indicates access information for the media asset. The content API then configures the application to access the media asset from the essence store based on an accessed track number and byte length of the respective media asset accessed in response to the query of the media essence access database.

In another exemplary aspect, a system is provided for configuring legacy file-based workflows to remotely and dynamically access media essence. In this aspect, the system includes a media essence repository configured to store a plurality of media assets; a media essence access database configured to store respective access metadata that indicates access information for the plurality of media assets, including a track number and byte length of each of the plurality of media asset; a filename generator configured to dynamically generate a filename for a corresponding at least one media asset of the plurality of media assets in response to a selection of the at least one media asset by a file-based workflow application running on a media production computing device, the selected at least one media asset comprising at least one of a clip, a video, an audio and a caption for use by the media production computing device; an identity file generator configured to generate a respective identity file for the selected at least one media asset, wherein the generated identity file comprises the dynamically generated filename and only meaningless data content; and an application context generator configured to determine a use context of the file-based workflow application running on the media production computing device. Moreover, the system includes a content application programming interface (API) configured to query the media essence access database using the generated identity file to obtain the metadata that indicates the access information for at least one media asset, and configure the file-based workflow application to access the at least one media asset from the media essence repository using the accessed track number and byte length of the respective at least one media asset obtained in response to the query of the media essence access database.

In a refinement of the exemplary system, the dynamically generated filename comprises a unique character sequence that configures the content API to query the media essence access database.

In another refinement of the exemplary system, the dynamically generated filename comprises a namespace section, a type section, a provider section and a provider path.

In another refinement of the exemplary system, the namespace section identifies the media essence repository, the type section indicates a type of the selected at least one media asset, the provider section configures the content API to add at least one plugin to support the media essence repository, and the provider path identifies the selected at least one media asset in the supported media essence repository.

In another refinement of the exemplary system, the content API is configured to dynamically adjust, based on the determined use context, media essence selection criteria that controls the providing of the at least one media asset to the file-based workflow application, such that the adjusted media essence selection criteria prioritizes one of quality and rendering speed based on the determined use context.

According to another exemplary aspect, the system further includes a media content recipe configured to generate a recipe comprising a plurality of generated identity files each having a respective filename associated with a respective media asset of the plurality of media assets stored in the media essence repository.

According to another exemplary aspect, the generated recipe is configured to be transmitted and parsed by a separate file-based workflow application, such that separate file-based workflow application is configured to parse the generated recipe and access the respective media asset of the plurality of media content stored in the media essence repository without receiving at least one file containing the respective media content.

According to another exemplary aspect, the dynamically generated filename for the respective identity file is configured to be repeatedly interpreted by a plurality of content application programming interfaces to configure respective file-based workflow applications to access the at least one media asset from the media essence repository using the accessed track number and byte length of the respective at least one media asset obtained in response to querying of the media essence access database.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1:
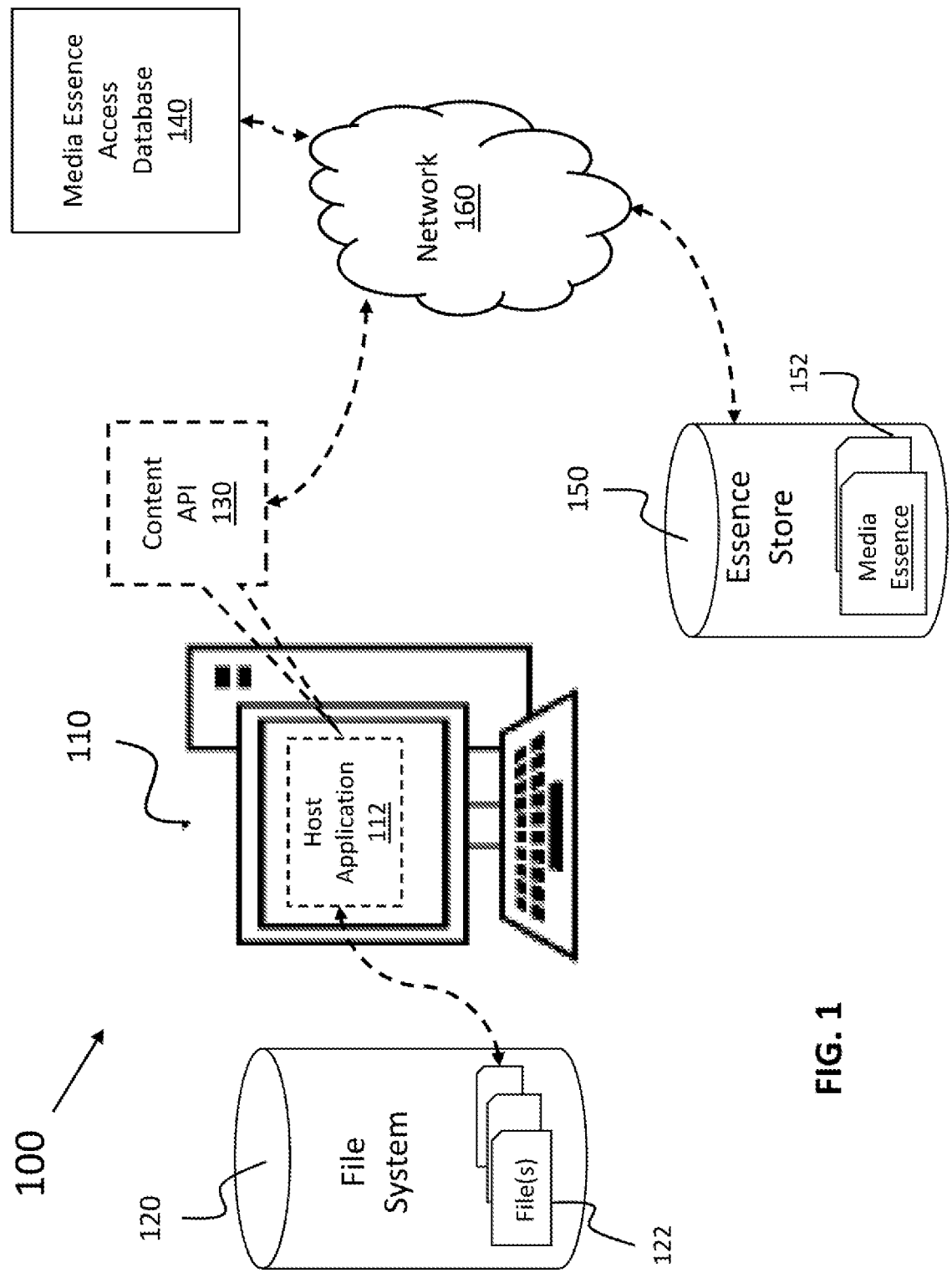
FIG. 1 illustrates a block diagram of a system for configuring legacy file-based workflows and applications to remotely and dynamically accessing media content according to an exemplary aspect.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1 illustrates a block diagram of a system 100 for configuring legacy file-based workflows and applications to remotely and dynamically accessing media content according to an exemplary aspect. As shown, the system 100 can be implemented for a computing device 110 (e.g., a media production system, personal computer or the like) that is configured to execute a host application 112, which can be a media production/video editing application such as Adobe Premiere Pro® or Avid Media Composer™, for example. Currently, such conventional applications assume that the media used in the workflows are stored in files. However, using the techniques described herein, the system and method configures the computing device 110 and host application 112 executed thereon to work in a hybrid context that look backwards to files and forwards to APIs to access "essence", which can generally be considered as media content or media assets. Moreover, it should be appreciated that while the exemplary system is described with respect to media production and video editing applications, for example, the exemplary system can be implemented for any legacy file-based application as would be understood to one skilled in the art and is not limited to media production and video editing applications.

As further shown, the host application 112 is communicatively coupled to a file system 120, which can be stored locally in the memory of the computing device 110 or on a server communicatively coupled to the computing device 110, as would be appreciated to on skilled in the art. In this aspect, the file system 120 includes a plurality of files 122 with each file having a format extension and whose name carries an identity of the file.

In operation (e.g., during media editing, for example), the user of the host application 112 may wish to access media essence (e.g., any type of media file, such as video, audio or the like) from a remotely located repository, such as essence store 150 (i.e., a media essence repository) that stores a plurality of media files (e.g., media essence 152). According to the exemplary aspect, the host application 112 is configured to use "identity files" (which can be referred to as "media essence identifiers"), which can be considered a special file system technique that enable the media essence 152 to be played with the host application. In this aspect, each identity file, which can be stored in the file system 120, for example, can be a hybrid or a bridge that configures the system to transition from a file-based workflow (i.e., the legacy host application), since the identity files are technically files and can be interpreted by the host application 122, to content API-based production.

Thus, according to the exemplary aspect, the host application is configured to load one or more Content Application Programming Interfaces "APIs" (e.g., content API 130) that configure the host application 112 to make policy decisions at runtime. During configuration, the content API 130 first registers with the host application 112 and indicates the type of file it can handle, which is typically determined by a unique extension string. Moreover, as will be described in greater detail below, the content API 130 is configured to access the media essence access database 140 containing information about the media identities (e.g., media essence 152) and then to access the media essence store 150 using the access information.

As further shown above, the media essence access database 140 and/or media essence store 150 (e.g., media essence repository) can be remoted located to the content API 130 and communicatively coupled over network 160. The applicable network 160 can be any network for communicating data and data operations and can include one or more specific communication systems (not shown) that connect the various components of the system by wire, cable, fiber optic, and/or wireless links facilitated by various types of well-known network elements, such as hubs, switches, routers, and the like. It should be appreciated that the network 160 may employ various well-known protocols to communicate information amongst the network resources. In one aspect, the network 160 can be part of the Internet or intranet using various communications infrastructure such as Ethernet, WiFi, mobile telecommunication networks, and the like.

According to the exemplary aspect, each identity file does not have actual content, i.e., it is "contentless", and thus the file does not expose its form or location (as opposed to traditional files in which the bytes determine its form or format). Instead, each identity file is only composed of a uniquely constructed filename and thus the filename is the only data that is preserved from the directory structure when a file is copied. It should be appreciated that the identity of the file is not lost when its location is changed. As a result, one or a plurality of identity files can be incorporated into recipe files (e.g., Adobe Premiere Pro project files) without losing their properties, as discussed below. Thus, if the computing device 110 receives (e.g., by email) a recipe file containing one or more identity files, the host application 112 using the content API 130 can see the same edits to the media essence 152 from anywhere in the world, for example.

It is noted that in one exemplary aspect, each identity file may have some small portion of content (i.e., meaningless data) to ensure the host application's client invariants are not broken. In other words, certain applications may generate an error message during runtime if a file contains 0 bytes. Thus, in one exemplary aspect, the identity file(s) is generated to include a few meaningless bytes of content to circumvent this potential application error during runtime. Otherwise, the filename of each identity file is the entirety of its composition and it has no useful content, unlike a conventional file in a file system that has two parts: the filename in the directory hierarchy and the bytes that they contain (i.e., the actual content).

According to an exemplary embodiment, the filename is composed of a plurality of sections that the content API 130 uses to configure the host application 112 to access the requested media essence. For example, the file name can be generated as a structured string that comprises distinct character sequences used as section separators. In one aspect, the string starts with a namespace section, followed by a type section, followed by a provider section and terminated by a specific content provider, which can be considered a "provider path" according to an exemplary aspect.

For example, in one exemplary aspect, the namespace can be the identity of the essence store 150 (e.g., "gvess") and the type can be the type of media essence to be access, such as "clip", "video", "audio", "captions" or the like. Moreover, the provider section configures host application 112 to add one or more plugins for the content API 130, so that the exemplary techniques can support many different identity file databases and essence stores, for example.

Exemplary content providers (e.g., essence store 150) can include the follow for example:
  "sq"—a bespoke embedded system that can record and play live video
  "stratus"—a bespoke database and workflow system that allows customers to build News offerings.
  "s3"—a store that exploits the Amazon S3® API so that essence can be stored in the Cloud.
  "dir"—a simple chunked essence cache on disk, i.e., using a local disk to store byte ranges in individual files.

Finally, the provider path contains the identity of the essence requested by the host application 112. In an exemplary aspect, the provider path only has meaning to the essence store 150 (i.e., the media) provider in question. Thus, as one example, if the host application 112 is requesting an "sq" clip, the provider path will include two integers that identify a zone ID and a clip ID. In another example, a provider path for a "stratus" video will include two GUIDs ("globally unique identifier") with a few additional details as necessary for identifying the essence requested by the host application 112.

As few examples of identity files are as follows. As should be appreciated, these filenames of the identity files include the namespace, type, provider and provider path as discussed above:
  ISA/sQ
    gvess~^clip~^sq~^10020~^233371.gves
    gvess~^video~^sq~^fb88f047-d31e-4583-b6a0-2fe8bed62bee.gves
    gvess~^audio~^sq~^0bfaf376-0443-4cec-be7d-7846fa6d0154.gves
  Stratus/K2
    gvess~^video~^stratus~^71d9ad9d-27c6-4c5c-b0a8-e4a426732f7a~^29d35e81-a808-48a5-ab3b-4d46adb1f9d3~^0~^video.I0.gves
  Directory Caches (full of Grains—including but not limited to Atoms)
    gvess~^video~^dir~^fb88f047-d31e-4583-b6a0-2fe8bed62bee.gves
  AWS S3 (tested with MinIO)
    gvess~^video~^s3~^d905a188-6301-4113-b735-860b12392dee.gves It should be appreciated that while the foregoing list provides examples of filenames for identity files in one aspect, the exemplary aspects should be in no way be so limited. Rather, according to the exemplary embodiment, a filename of an identity file can use any type of content/format as long as the filename (without any meaningful content in the file itself) enables the content API 130 to configure the host application 112 to remotely and dynamically access the media essence 152 as described herein.

As shown in the example identity files above, the provider path of each identity file has a unique string format for each identity that it represents. During operation when a user is operating the host application 112, as a video editing application, for example, a graphical user interface ("GUI") hosted in a webpage is presented to the user to search for media essence, such as video clips to be used for the workflow. For example, the user can execute a search against a directory, such as an ISA/sQ database/server pair, and the GUI hosted in the webpage will return the search results. If the user selects and drags a particular clip (e.g., an example of media essence 152) from the search results in the webpage into the host application 112, the webpage includes code (serving as a filename generator) that is configured to dynamically generate a filename that represents the user's choice. The dynamically generated filename will thus correspond to the selected media content and can be, for example, one of a clip, a video, an audio and a caption for use by the media production computing device, as described herein. According to this aspect, the dynamically generated filename is used to create a corresponding identity file for the selected essence on the file system 120 at the user's request.

It should be understood that in this example, the webpage, and more specifically the filename generator, knows the nature of the source provider and what essence the source provider can provide in order to dynamically generate the filename to be used as the corresponding identity file. Thus, in the example described above, the webpage based code knows that the source is an ISA/sQ and is configured to identify the provider as "sq". Moreover, the namespace is hard coded and the type depends on the search results. For example, since the user selected a clip as the essence to be accessed, the type is dynamically identified as a "clips". Finally, the construction of the provider path is agreed between the source provider and the webpage. For example, if the provider path include the two integers to identify the zone ID and the clip ID, these ISA "ZoneID" and the "ClipID" will be concatenated by an agreed separator to complete the filename.

Based on the foregoing description, it should be appreciated that in general, there is always a context to initiate the filename construction that knows all the details required to dynamically (e.g., "on-the-fly") generate the full filename. The particular syntax for the generated filename can be modified as necessary as long as the final identity file configures the host application 112 to access the API-based media essence as described herein.

In any event, once the user selects the specific media essence (e.g., media essence 152) to be accessed, which may be a video clip as described above, an identity file generator is configured to generate a corresponding identity file that includes the dynamically constructed filename, which is then offered to the host application 112. Using the constructed filename, and in particular the provider section discussed above, the host application 112 is configured to determine which plugin to call to handle the file type of the requested media essence in question. In general, it should be appreciated that for conventional file-based applications, an existing plugin would open the file and determine the structure of the contained essence (such as number and type of tracks, nature of the contained essence and the duration of the essence, measured in time, for example) by parsing the byte stream, i.e., the actual data content inside the file. However, as described above, there are no bytes (of meaningful data) inside the identity file and only the filename is parsed. Once the filename has been parsed by the content API 130, the content API 130 has sufficient identifying information to query the media essence access database 140, to access metadata that indicates access information for the plurality of media content and can include, for example, the number and type of tracks, the nature of the referenced essence and the duration of the essence, measured in time.

According to an exemplary aspect, the host application 112 will typically, at some later time, call the plugin to access some essence from "within" the file (i.e., meaningful data content that would otherwise be contained within a convention media file). For example, the essence will be requested by a time offset within this duration. In conventional operation, a typical plugin will use the time offset to query the index stored within the file, which has the role of mapping time to byte ranges for each track, so that a time offset for a track within a file has a unique and deterministic byte range that represents the media to be played at that time. However, using an identity file, the essence request parameters will be combined with the filename-based identity as described above to build a query against the media essence access database 140. As discussed above, this query will provide sufficient identification and access information (e.g., metadata providing media essence access information) for the content API 130 to then query the essence store 150 for the required byte range to offer to the host application 112 for accessing the specific media essence 152 desired by the user. Accordingly, the host application 112, as a legacy file-based application, is effectively configured to remotely and dynamically access API-based media essence using the exemplary techniques described herein.

Moreover, in one exemplary aspect, a media essence request can be dynamically configured based on the intended use of the requested essence (i.e., based on the use as requested by the user of the host application 112). For example, the host application 112 can be configured to include an application context generator configured to determine a use context of the file-based workflow application running on the media production computing device. In an exemplary aspect, intended use or context can include, for example, "scrubbing", i.e., whizzing along a timeline as the user tries to find a certain sequence of essence. In addition, the intended use may include "playing" where the user is expecting to see all the frames presented in a timely manner in the correct order. Yet further, the intended use may include "rendering" where the user is instructing the host application 112 to generate/create new essence from other essence using a process controlled by particular application settings, for example.

In an exemplary aspect, the host application is configured to monitor the user's actions to determine the context that represents the intended use that the user is trying to achieve using the host application 112. This dynamically determined context is passed to the plugin, such that the content API 130 is configured to make dynamic selections regarding the nature (or quality) of the essence to supply based upon each different context of the host application 112. In one aspect, the plugin is configured to determine media essence selection criteria based on a predetermined policy, which can be set by the user, a system administrator or the like. For example, the predetermined media essence selection criteria can be set upon application installation where a particular user may select media essence selection criteria of "quality all the time" whereas another user may select media essence selection criteria of "always proxy", even for renders, as the workflow may be that the user provides a generated recipe file to a render farm for the final video creation as the user is remote to wherever the quality media is stored, and, therefore, requires high speed provision of the requested media essence.

Other media essence selection criteria that can be selected by a user, or, alternatively, automatically determined by the host application 112, can include, "proxy for everything but render" or "quality for everything but scrub", for example. Yet further, the host application 112 can include a learning algorithm where it can monitor a user's actions. If the user visits a frame for the first time, the media essence selection criteria can be for "proxy" and for each subsequent visit it can be for "quality", as the host application can determine using the learning algorithm that the particular user has focused on this particular essence as part of their video edit. In a refinement of these exemplary aspects, the media essence selection criteria can be customized to particular users of the host application. For example, the predetermined selection policy can be based on the identity of the user. Thus, when a particular user logs into the system of the computing device 110, the identity of that user is asserted and the corresponding media essence selection policy is accessed. In this aspect, the computing system 110 can store a plurality of profiles for each user of the host application 112 that determine the quality/proxy policy the user gets based upon the intended workflow.

Referring back to the examples described above, different "contexts" or "intended uses" can include "playing", "scrubbing" or "rendering", for example, and that such contexts can be matched to predetermined policies that specify media essence selection criteria. For example, when the intended use is "playing", it is more important to access the essence quickly (compared with accessing a high-quality rendition of the essence). Thus, the content API 130 is configured to select the "proxy", i.e., low quality rendition of the essence from the essence store 150 in question for this request. As a result, the content API 130 enables provision over a wide area network or high latency/low bandwidth link. Alternatively, when the intended use is "rendering", the quality of the accessed media essence is the most important characteristic so the content API 130 is configured to select the highest quality rendition available in the essence store 150, even if such selection means the provision of the result may take a longer time than simply accessing a low quality rendition of the requested media essence.

It should be appreciated that according to this exemplary aspect, the content API 130 is configured to dynamically adjust its decisions at runtime (i.e., "on-the-fly") on a per request basis, for example. Conventional system cannot provide this dynamic customization of the selection of media essence as the index stored within the file has a simple mapping between time and byte ranges. Thus, legacy file-based applications require a reference to two essence files concurrently, one for proxy, one for quality. As such, the host application 112 must separately determine when to request quality of proxy renditions. Conversely and advantageously, the content API 130 of the exemplary embodiment enables this decision to be made within the plugin and without the host application 112 being aware of this policy.

As described above, because identity files do not contain any content (or at least do not contain any meaningful data content), the identity files do not expose the location of the essence. As a result, the content API 130 can provide essence byte ranges over alternate transport protocols such as HTTP. Moreover, identity files do not expose the form of the essence. This allows the content API 130 to also provide the essence byte ranges arbitrarily in a just in time manner, rather than requiring all the essence in a time range to be copied to the filesystem that contains the essence file. As such, small chunks of essence can be collected as they are requested by the host application 112, which effectively reducing the use of computing and data storage requirements for the computing device 110 as would be appreciated to one skilled in the art.

Yet further, in one exemplary aspect, the entirety of the media essence does not need to exist before the host application 112 opens the essence file. For example, the content API 130 can be configured to provide access to a one-hour live recording that has only partially completed. If a conventional essence file were to be used, the host application 112 would have to "poll" the file to discover any new duration that might be present in the track indexes. In contrast, using identity files, the specific essence file can be reported as one-hour long and quite stable, but the content API 130 can be configured to report to the host application 112 that the essence above the "record head" is missing and thus not yet available. As a result, the host application 112 can effectively open a one-hour file with which the essence availability can be effectively growing in concert with the live recording.

During the process of the media production (e.g., the video editing workflow), a host applications 112 will in some instances combine a selection of essence file references (or "ingredients") into an "edit" or "timeline" composition. Moreover, each timeline can be stored in their own files (e.g., in file system 120) for later retrieval and re-editing. Accordingly to an exemplary aspect, these files can be seen as "recipes" that provide instructions for how to combine the essence file references (i.e., the "ingredients") in order to produce a desired outcome. By creating a recipe that contains a plurality of identity files, the recipe is configured as self-describing. In other words, a subsequent host application (e.g., host application 112) can be configured to parse the recipe files to identify specific filenames to produce a complete bill of materials that identifies a list of all the sources used. As such, the generated bill of materials provides the filenames with identities of which media essences have been used in the particular edit of the recipe. One skilled in the art would appreciate that such information can advantageously be provided for generating a copyright tracking system, for example, as the resulting information can specify the essence used in the composition and where the essence has been used.

According to the exemplary embodiment, each dynamically generated identity file is unique. As a result, once it is created it can be used by any file-based workflow application, provided that the media asset that it is linked to is still available in the designated essence repository. In other words, the lifetime of the identity file is determined by the bytes for the media assert being available in the repository. Moreover, by providing a unique character sequence, each identity file is configured to provide repeatable access by a plurality of host applications with respective content APIs (e.g., content API 130). In this aspect, the recipe files can be considered "self-contained" and portable. This means that if a recipe file (which can contain a single identity file or a plurality of identity files as described above) is transferred to another host application (e.g., by email for example), the receiving host application will require all essence files referenced to be available using the same paths as the original host application. With traditional (e.g., large) essence files, this process often becomes very complex and cumbersome, as all the essence files need to be transferred in concert with the recipe file and stored in the file system, for example.

In contrast, by using only identity files (which is configured as a file reference to the media asset) as essence files inside a recipe file, the receiving host application can be configured to parse the recipe file to identify only the filenames, which then can be used to reconstitute (or rehydrate) the required identity files, without having to refer to any additional data source. Then, as long as the new host application is configured to load a content API (e.g., content API 130) and the content API 130 is configured to access a database containing information about media identities (e.g., media essence access database 140) and to access to a media essence store (e.g., essence store 150), the timeline will appear to the user of the new host application identically to the timeline presented by the original host application. Such transfer for the recipe file (without transferring the actual essence) significantly reduces bandwidth consumption and data storage resources as would be appreciated to one skilled in the art.

It should further be appreciated that because each identity file is configured as a file reference to a respective media asset in an essence repository, each host application that uses the identity file to access the particular media asset will always access the current version of the media asset. In contrast, with conventional file-based workflows, the respective application will always be working with the version of the media asset that it currently has in its file system, which may not be the most up-to-date version of the media asset. In contrast, the identity file is configured as a consistent file reference to the most up-to-date version of the media asset in the essence repository. Therefore, if a system administrator makes an editorial change to the media asset, for example, each host application accessing this asset using the respective file identity will always access the correct version of the media asset.

Figure 2:
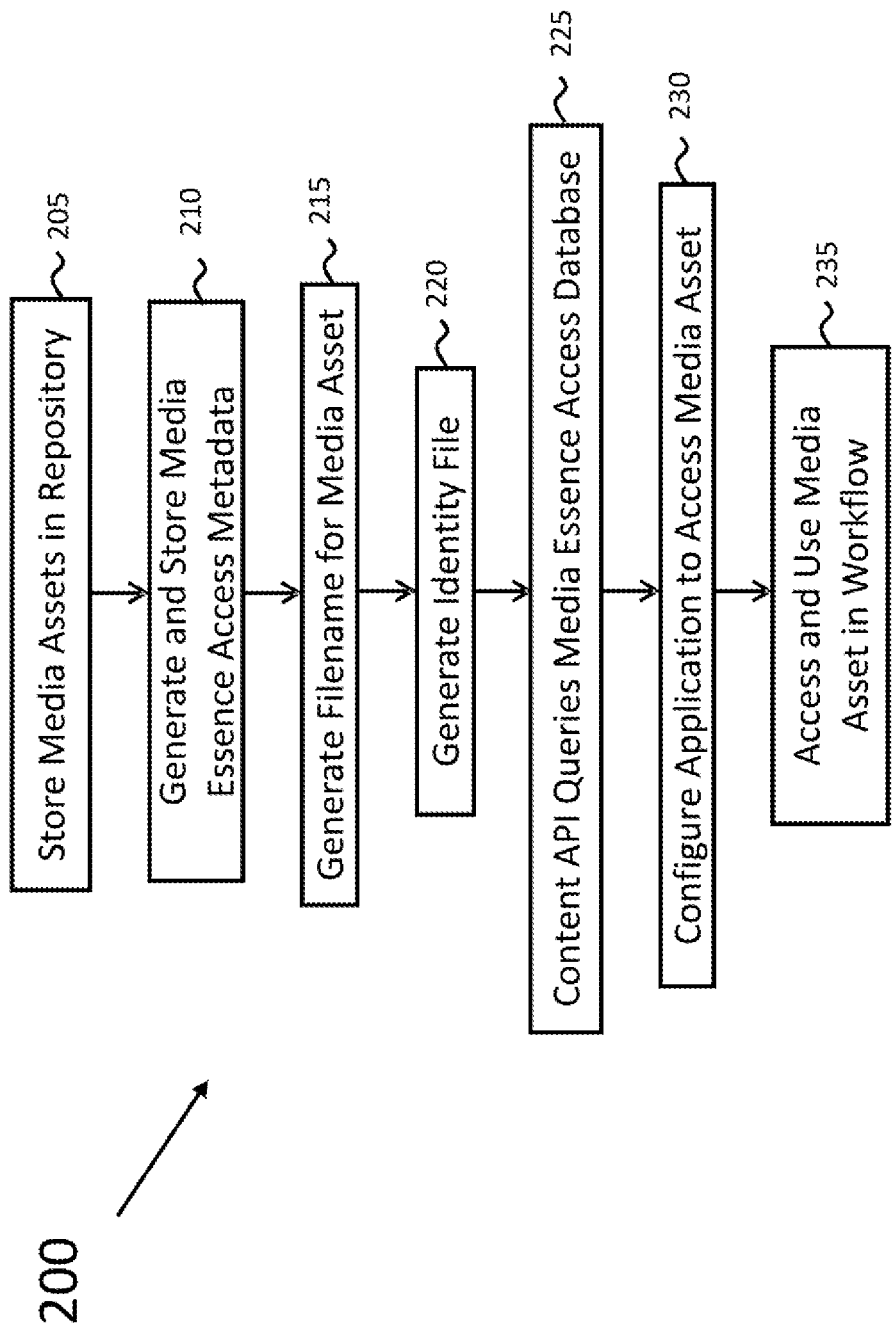
FIG. 2 illustrates a flowchart for a method for configuring legacy file-based workflows and applications to remotely and dynamically accessing media content according to an exemplary aspect.

FIG. 2 illustrates a block diagram of a flowchart for a method 200 for configuring legacy file-based workflows and applications to remotely and dynamically accessing media content according to an exemplary aspect. It is noted that the exemplary method can be performed using the exemplary components described above with respect to system 100 of FIG. 1.

As initially shown at Step 205, one or more likely a plurality of media assets are stored in a media essence repository, such as essence store 150 described above. While it is possible that the media asserts are all stored in the repository at the same time, it is more likely that these media assets (e.g., media files) are built up in the repository over time.

Either at the time each media asset is stored in the media essence repository or at a subsequent time, metadata related to each media asset in the repository is separately stored in a media essence access database at Step 210. As described above, the media access metadata is related information that that indicates access information for each of the plurality of media assets, and can include, for example, a track number and byte length of each of the plurality of media asset. As described above, this metadata is subsequently used to access the one or more media assets.

Subsequently, when a filed-based workflow application is running on a media production computing device, the application may need to access one or more media assets for editing, etc., as part of its workflow. Moreover, according to conventional techniques, the one or more media assets may be listed as conventional media assets to the application. However, according to an exemplary aspect, upon receiving a selection by the application to access the one or more media assets, a filename generator dynamically generates a filename for the requested media asset at Step 215. As also described in detail below the uniquely constructed filename for the requested media asset is the only data that is preserved from the directory structure and be generated, for example, as a structured string that includes distinct character sequences used as section separators, such as a namespace, a type, a provider and a provider path.

Concurrently or after the file name is generated, an identity file generator generates a respective identity file at Step 220 for the selected media asset that includes only the dynamically generated filename and, if needed as required by the application, a few bytes of meaningless data content to avoid any runtime errors.

At Step 225, a content API that has registered with the filed-based workflow application (indicating which type of files it can handle) then queries the media essence access database using the generated identity file to obtain the metadata that indicates the access information for the requested media asset(s). At Step 230, the content API also configures the file-based workflow application to access the media asset(s) from the media essence repository using the accessed track number and byte length of the respective at least one media asset obtained in response to the query of the media essence access database. Finally, at Step 235, the file-based workflow application, via the content API, accesses the requested media asset(s) as part of its workflow.

Figure 3A:
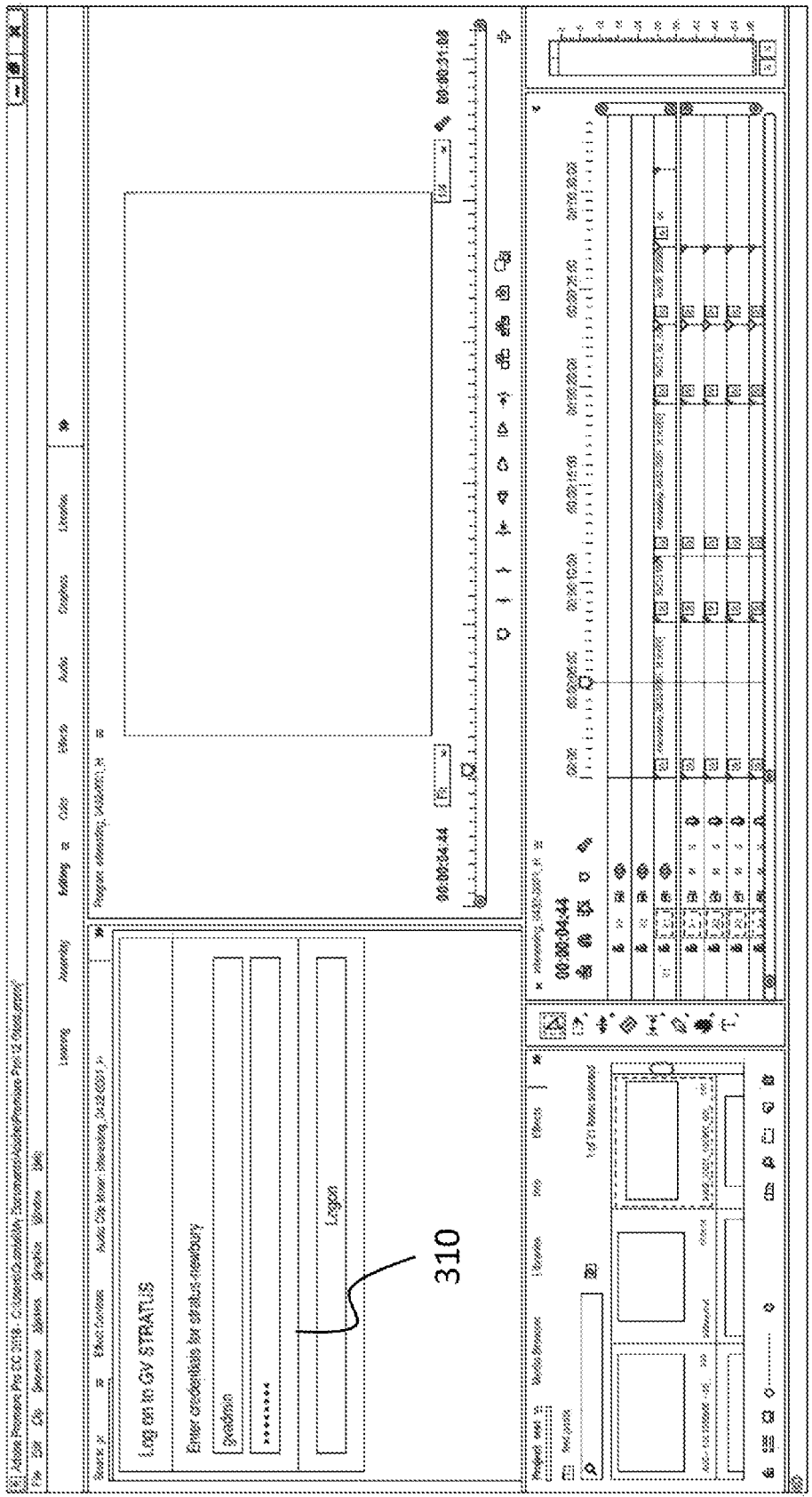
FIG. 3A illustrates a screen shot illustrates a "logon" webpage to an exemplary video editor (e.g., a host application 112) to access one or more media assets according to an exemplary aspect.

FIG. 3A illustrates a screen shot illustrates a "logon" webpage to an exemplary video editor (e.g., a host application 112) to access one or more media assets according to an exemplary aspect. As generally shown, in one exemplary embodiment, a user operating a host application to access a media asset may be required to login by entering appropriate user credentials via user interface 310 before the user is provided a listing of media assets to access and/or add as a recipe for a workflow, for example.

Figure 3B:
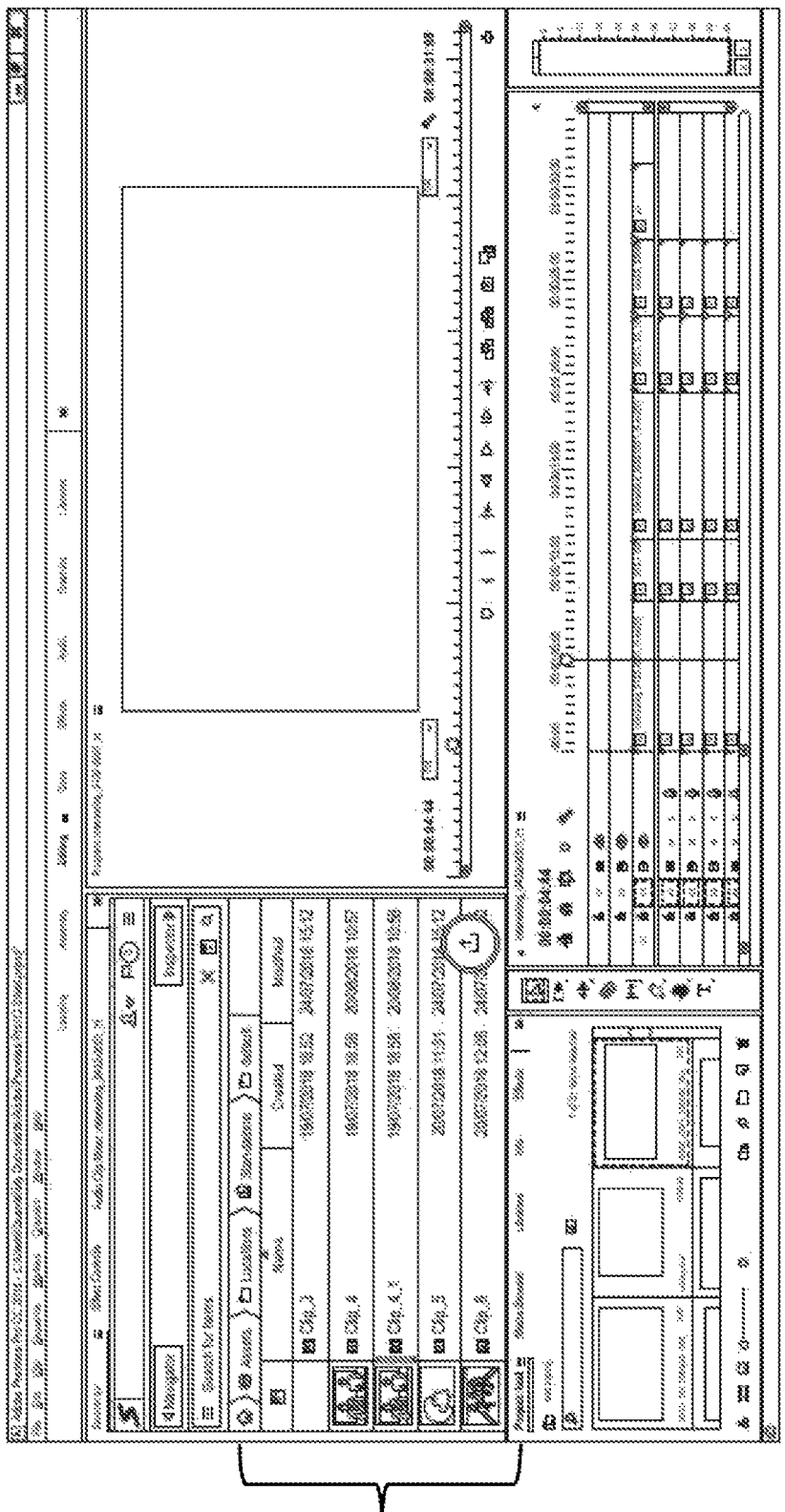
FIG. 3B illustrates a screen shot illustrates a list of media assets (i.e., a plurality of media essence or assets) that are included in a specific recipe in a user's created timeline that the user plans to export back to a central system, and which can be accessed by other host applications according to an exemplary aspect.

FIG. 3B illustrates a screen shot illustrates a list of media assets (i.e., a plurality of media essence or assets) that are included in a specific recipe in a user's created timeline that the user plans to export back to a central system, and which can be accessed by other host applications according to an exemplary aspect. As shown, a user interface 312 is provided after the user logs into the host application that enables a user to select one or more media assets as part of a defined recipe for a workflow.

Figure 3C:
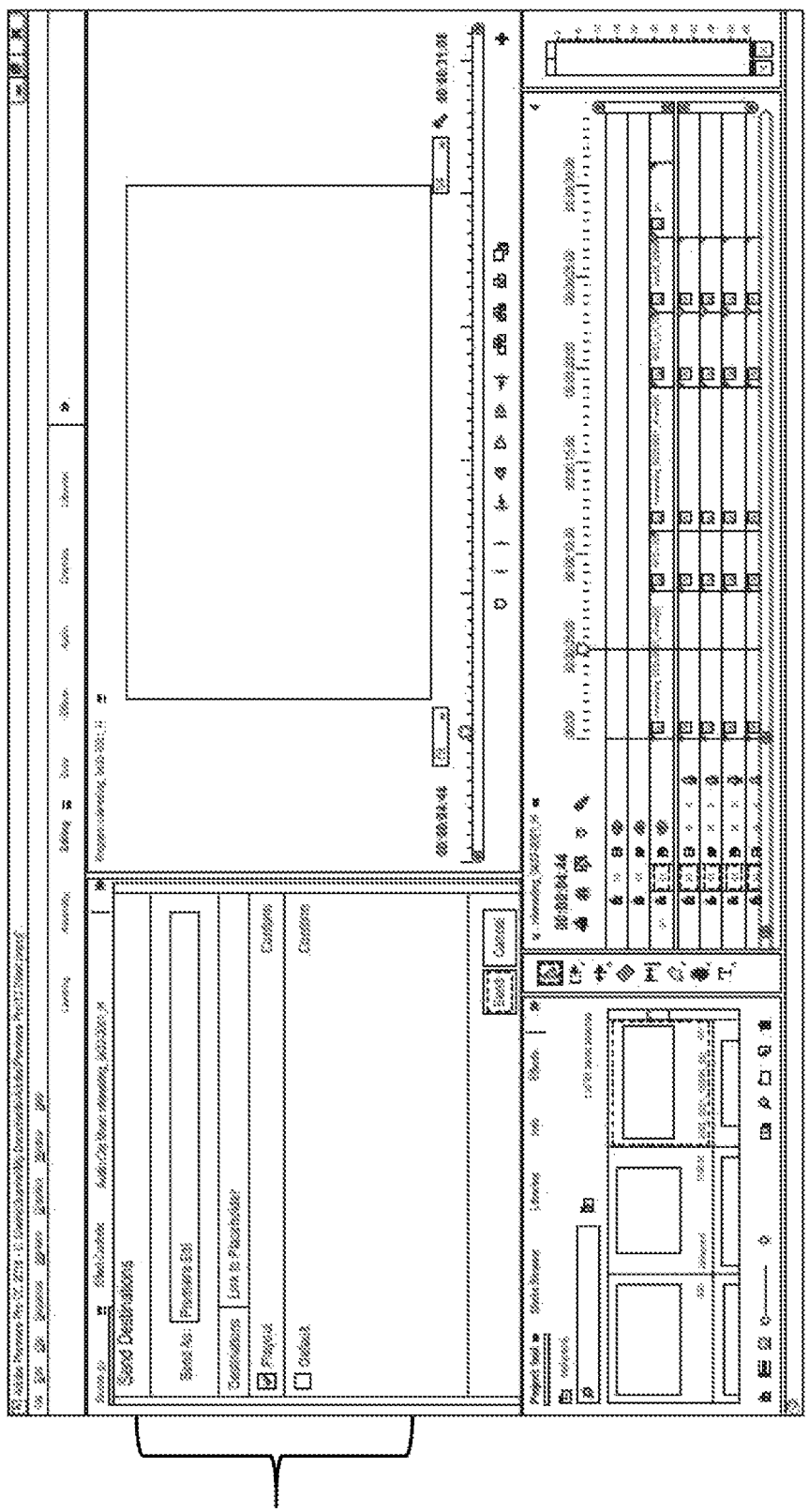
FIG. 3C illustrates a screen shot as an example of a user's selection to access (i.e., import) the selected media asset according to an exemplary aspect

FIG. 3C illustrates a screen shot as an example of a user's selection to access (i.e., import) the selected media asset according to an exemplary aspect. As described above, by selecting the particular assert for import to the file-based workflow, a filename and identity file are dynamically generated for this asset that can be used by the content API 130 to access the desired essence from a media asset repository. As further shown, the user can select a destination for the identity files using a "send destination" request via interface 312.

In general, according to an exemplary embodiment, the disclosed system and method described herein can be implemented using a number of "modules". The term "module" can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 4:
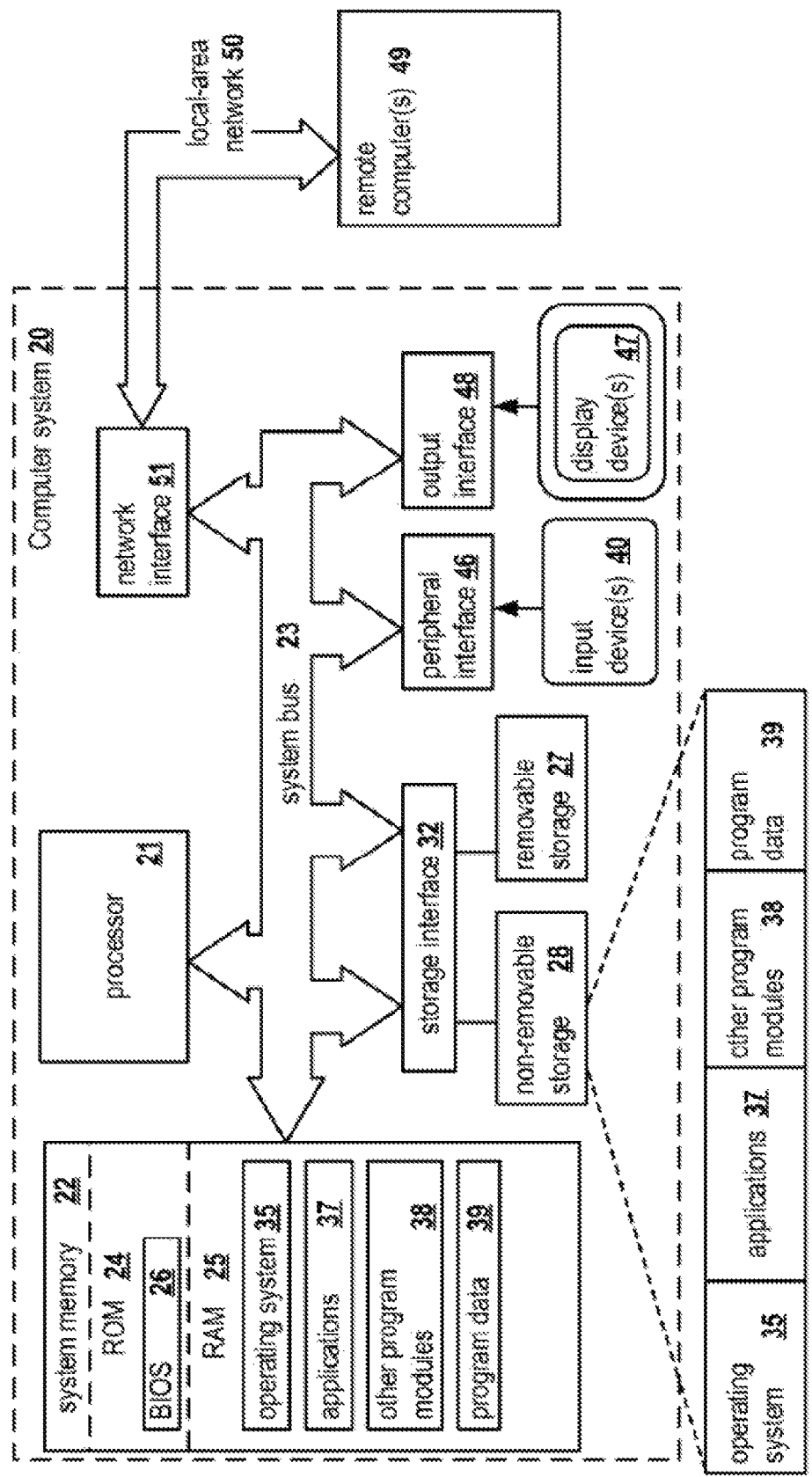
FIG. 4 illustrates an example of a general-purpose computer system on which the disclosed system and method can be implemented according to an example aspect.

In general, it should be appreciated that the methods, devices, processing, and logic described above may be implemented in many different ways and in many different combinations of hardware and software. For example, FIG. 4 illustrates an example of a general-purpose computer system (which may be a personal computer or a server) on which the disclosed system (e.g., computing device 110 and host application 112) and method can be implemented according to an example aspect. For example, all or parts of the implementations may be circuitry that includes an instruction processor, such as a Central Processing Unit (CPU) as shown in the computer system in FIG. 5, microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

In one exemplary aspect, FIG. 4 is a block diagram illustrating a computer system 20 on which aspects of systems and methods of remotely and dynamically accessing media content according to an exemplary aspect. It should be noted that the computer system 20 can correspond to the system 100 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audio-visual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. Moreover, the term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for configuring legacy file-based workflows to remotely and dynamically access media essence, the system comprising:
    a media essence repository configured to store a plurality of media assets;
    a media essence access database configured to store respective access metadata that indicates access information for the plurality of media assets, including a track number and byte length of each of the plurality of media asset;
    a memory and a processor configured to implement instructions on the memory so as to provide:
        a filename generator configured to dynamically generate a filename for a corresponding at least one media asset of the plurality of media assets in response to a selection of the at least one media asset by a file-based workflow application running on a media production computing device, the selected at least one media asset comprising at least one of a clip, a video, an audio and a caption for use by the media production computing device;
        an identity file generator configured to generate a respective identity file for the selected at least one media asset, wherein the generated identity file comprises the dynamically generated filename and only meaningless data content; and
        an application context generator configured to determine a use context of the file-based workflow application running on the media production computing device; and
    a content application programming interface (API) configured to:
        query the media essence access database using the generated identity file to obtain the access metadata that indicates the access information for at least one media asset, and
        configure the file-based workflow application to access the at least one media asset from the media essence repository using the accessed track number and byte length of the respective at least one media asset obtained in response to the query of the media essence access database,
    wherein the dynamically generated filename comprises a unique character sequence that configures the content API to query the media essence access database,
    wherein the dynamically generated filename comprises a namespace section, a type section, a provider section and a provider path, wherein the namespace section identifies the media essence repository, the type section indicates a type of the selected at least one media asset, the provider section configures the content API to add at least one plugin to support the media essence repository, and the provider path identifies the selected at least one media asset in the supported media essence repository, wherein the content API is configured to dynamically adjust, based on the determined use context, media essence selection criteria that controls the providing of the at least one media asset to the file-based workflow application, such that the adjusted media essence selection criteria prioritizes one of quality and rendering speed based on the determined use context.

2. The system according to claim 1, wherein the processor is further configured to implement the instructions on the memory so as to generate a recipe comprising a plurality of generated identity files each having a respective filename associated with a respective media asset of the plurality of media assets stored in the media essence repository.

3. The system according to claim 2, wherein the generated recipe is configured to be transmitted and parsed by a separate file-based workflow application, such that separate file-based workflow application is configured to parse the generated recipe and access the respective media asset of the plurality of media content stored in the media essence repository without receiving at least one file containing the respective media content.

4. The system according to claim 1, wherein the dynamically generated filename for the respective identity file is configured to be repeatedly interpreted by a plurality of content application programming interfaces to configure respective file-based workflow applications to access the at least one media asset from the media essence repository using the accessed track number and byte length of the respective at least one media asset obtained in response to querying of the media essence access database.

* * * * *